United States Patent
Nakatani et al.

[11] Patent Number: 5,954,168
[45] Date of Patent: Sep. 21, 1999

[54] DUST COVER FOR SHOCK ABSORBER AND METHOD OF MANUFACTURING THE SAME

[75] Inventors: Keiichiro Nakatani, Powell; Nobuhide Tanaka, Grove City, both of Ohio

[73] Assignees: American Showa, Inc., Sunbury, Ohio; Tigers Polymer Corp., Osaka, Japan; Tigerpoly Mfg., Inc., Grave City, Ohio

[21] Appl. No.: 08/864,185

[22] Filed: May 28, 1997

[51] Int. Cl.$^6$ .................................................. F16F 9/38
[52] U.S. Cl. ................................. 188/322.12; 267/64.27
[58] Field of Search .............................. 188/322.12, 298; 267/64.27, 64.23, 64.19; 74/218.2; 29/454; 277/636

[56] References Cited

U.S. PATENT DOCUMENTS

| | | | |
|---|---|---|---|
| 2,942,838 | 6/1960 | Peters | 74/218.2 X |
| 4,114,460 | 9/1978 | Oto | 74/218.2 |
| 4,969,542 | 11/1990 | Athmer et al. | 188/322.12 |
| 5,161,454 | 11/1992 | Fraiser | 277/212 FB |

FOREIGN PATENT DOCUMENTS

63-27158  7/1988  Japan .

*Primary Examiner*—Robert J. Oberleitner
*Assistant Examiner*—Robert A. Siconolfi
*Attorney, Agent, or Firm*—Merchant & Gould P.C.

[57] ABSTRACT

A dust cover includes a bellows-like portion which is comprised of a large-pitched portion and a small-pitched portion in succession, each having a plurality of alternating ridges and grooves of uniform diameter. The ridges and grooves of the large-pitched portion are spaced at an equal but large pitch while the ridges and grooves of the small-pitched portion are spaced at an equal but smaller pitch. The ridges of the small-pitched portion have a thickness smaller than that of the ridges of the large-pitched portion. When a force is applied to the dust cover in a direction of contraction, the dust cover first contracts at the small-pitched portion and then at the large-pitched portion, whereby undesired buckling thereof is kept to a minimum. A method for blow molding the dust cover is also disclosed.

3 Claims, 8 Drawing Sheets

DUST COVER FOR SHOCK ABSORBER AND METHOD OF MANUFACTURING THE SAME

BACKGROUND OF THE INVENTION

1. Field of the Invention

The present invention relates to an improvement in a bellows-like dust cover (boot) for protecting a shock absorber in an automobile suspension system against dust and muddy water.

2. Description of the Related Art

Many recent automobiles employ a strut suspension in which a shock absorber is used as a strut for wheel positioning. Such a strut suspension is comprised of a shock absorber and a coil spring positioned around the shock absorber. To protect the shock absorber against dust and muddy water, a dust cover is provided to extend around the shock absorber such that it covers the shock absorber over an area spanning from a piston rod portion to a body portion thereof with a given clearance between an outer periphery of the shock absorber and the dust cover. The dust cover has a bellows-like portion and is thus capable of telescopic action so that it can follow the telescopic action of the shock absorber.

The coil spring and dust cover are interrelated such that there should be formed a predetermined clearance between the dust cover and coil spring by the dust cover becoming larger in outer diameter when contracted. Whereas, for miniaturization of automobiles, such a clearance between the coil spring and dust cover should be kept to a minimum.

Figure 8:
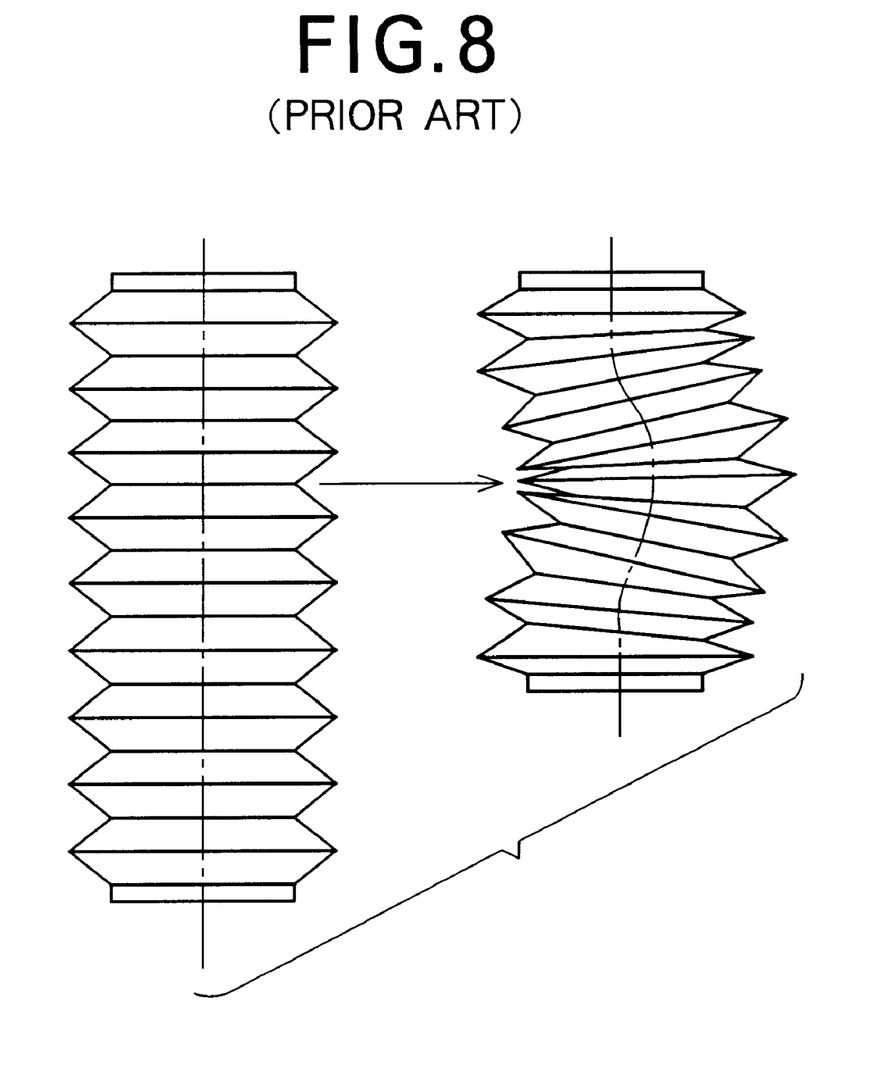
FIG. 8 is a schematic view showing how a conventional dust cover buckles upon contraction thereof.

The bellows-like portion of such a conventional dust cover is comprised of a series of alternating ridges and grooves, the ridges being spaced apart at an equal pitch and having the same height. When blow molding the dust cover having such a complex portion, it is difficult to render it uniform in thickness at all portions thereof. Thus, the resulting dust cover may have weak and strong portions due to the thickness irregularities and is thus liable to experience buckling wherein the dust cover, when contracted, deforms to partially project laterally as shown in FIG. 8 hereof. This may give rise to such instances that when a coil spring extending around an outer periphery of the dust cover is compressed, the dust cover is pinched between adjacent two spirals of the coil spring, thus damaging the dust cover.

Improved dust cover is described in Japanese Utility Model Kokoku (Post-Exam) Publication No. SHO 63-27158 in which arrangements are made to prevent the aforementioned dust cover buckling. The bellows-like portion of the dust cover is comprised of a series of alternating ridges and grooves, the ridges having heights and pitches becoming small gradually from an upper end to a lower end of the dust cover and the grooves having substantially the same diameter. By virtue of the ridge heights and pitches becoming gradually small toward the lower end, contractive deformation takes place gradually from the upper to lower end of the dust cover so that its buckling can be kept to a minimum.

However, due to the bellows-like portion which is complicated in construction, difficulty is experienced in manufacturing the dust cover disclosed in Japanese Utility Model Post-Exam Publication No. SHO 63-27158. The dust cover is made from a rubber material by molding. For this molding, two metal molds are required which have grooves for forming the corresponding dust cover ridges having heights and pitches gradually becoming small toward the lower end thereof, as well as ridges for forming the corresponding dust cover grooves of substantially the same diameter. Manufacture of the metal molds with such complicated grooves and ridges is quite difficult and costly.

SUMMARY OF THE INVENTION

It is therefore an object of the present invention to provide an improved dust cover which is less complicated in construction than the secondly-mentioned conventional dust cover and in which buckling or lateral bending of a body portion of the dust cover upon contraction thereof can be minimized.

Another object of the present invention is to provide a method for manufacturing such an improved dust cover.

In one aspect of the present invention, there is provided a dust cover comprising an improved bellows-like portion. The bellows-like portion has an inner diameter (groove diameter) and an outer diameter (crest diameter), which are uniform along the length thereof, and is comprised of plural groups of alternating ridges and grooves, the ridges and grooves of one group being spaced at one equal pitch and the ridges and grooves of the other groups being spaced at other equal pitches. In preferred forms, the dust cover comprises two ridge groups, namely, a large-pitched group and a small-pitched group, or three ridge groups, namely, a large-pitched group, a medium-pitched group and a small-pitched group. Additional number of differently-pitched groups of ridges is undesirable. When a compressive or longitudinal force is applied to the dust cover having the large-pitched portion in combination with the small-pitched portion, the small-pitched portion first contracts and then the large-pitched portion. As a result, the bellows-like portion contracts in a two-phased fashion, thus exhibiting small buckling deformation compared to the secondly-mentioned prior bellows-like portion having a uniform pitch along its entire length. In the bellows-like portion with the three differently-pitched portions, contraction takes place in a three-phased fashion, that is, from the small-pitched portion, medium-pitched portion and then to the large-pitched portion. Metal molds for blow molding the dust cover having the bellows-like portion according to the present invention is less complex in construction and more easy to manufacture than the secondly-described prior dust cover, because the inventive bellows-like portion has only two or three differently-pitched portions while the ridges of the prior bellows-like portion have pitches varying continuously.

Moreover, in the bellows-like portion of the dust cover according to the present invention, the small-pitched portion has a thickness smaller than the thickness of the medium- or large-pitched portion. As a result, the small-pitched portion is more flexible than the medium- or large-pitched portion, whereby the bellows-like portion smoothly contracts from the small-pitched portion to the large-pitched portion, or the medium-pitched portion and then to the large-pitched portion, causing the least buckling.

In another aspect of the present invention, there is provided a method for manufacturing a dust cover, which comprises the steps of: providing a pair of metal molds each having at least two differently-pitched corrugated portions in succession on an inner side thereof, each of the corrugated portions having a crest diameter and a groove diameter, which are uniform along the entire length thereof; placing a blow moldable material (parison) between the metal molds mated together; blowing pressurized air into the blow moldable material to swell the material; and cooling the swollen material to thereby obtain a dust cover including a bellows-like portion of a configuration complementary with the differently-pitched corrugated portions of the metal molds.

BRIEF DESCRIPTION OF THE DRAWINGS

Preferred embodiments of the present invention will now be explained in detail, by way of example only, with reference to the accompanying drawings, in which.

DETAILED DESCRIPTION OF THE PREFERRED EMBODIMENT

Figure 1:
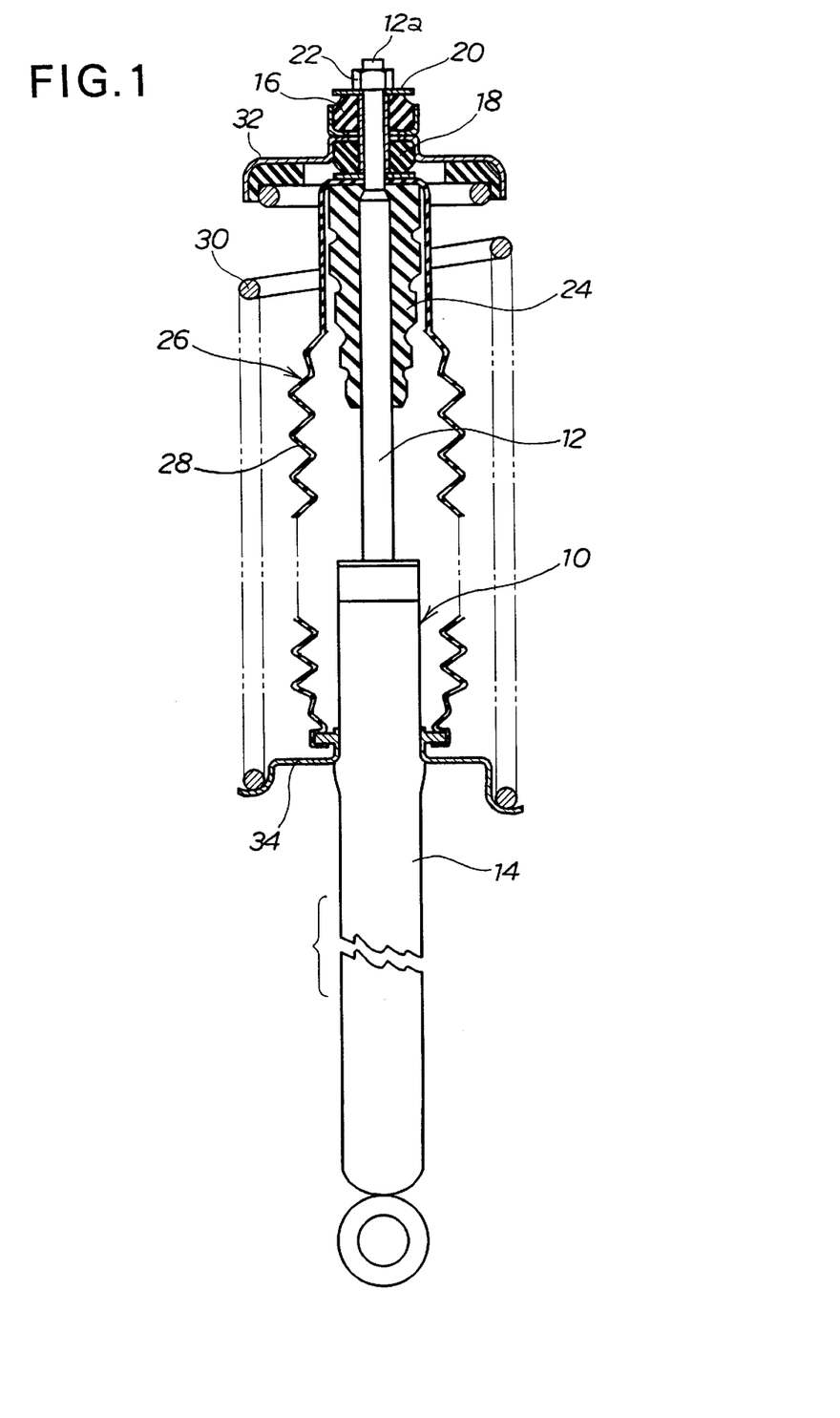
FIG. 1 is a cross-sectional view showing a suspension system employing a dust cover according to the present invention.

Referring to FIG. 1, a shock absorber 10 is designed for damping shocks or vibrations resulting from a road surface and includes a rod portion 12 and a cylinder portion 14. The rod portion 12 has a top end 12a connected, via vibration isolating rubber members 16 and 18, to a vehicle body (not shown) by means of a washer 20 and a nut 22. On a upper side of the rod portion 12, there is provided a bump stop 24 made of a rubber material for limiting or stopping upward movement of the cylinder portion 14 upon contraction of the shock absorber 10.

Dust cover or boot 26 according to the present invention is disposed to extend from an upper part of the rod portion 12 to an upper part of the cylinder portion 14 with the bump stop 24 enclosed therein. The dust cover 26 is made from a rubber material and has a bellows-like portion 28 capable of telescopic action in association with the telescopic action of the shock absorber 10.

Reference numeral 30 designates a coil spring for damping vibrations and shocks to be transmitted from a road surface to a vehicle body. The coil spring 30 is disposed to extend around the shock absorber 10 and dust cover 26 with a given space between an outer periphery of the dust cover 26 and the coil spring 26. The coil spring 30 is interposed between a base member 32 provided at an upper end side of the rod portion 12 of the shock absorber 10 and a support member 34 fixedly secured to an upper side of the cylinder portion 14.

Figure 2:
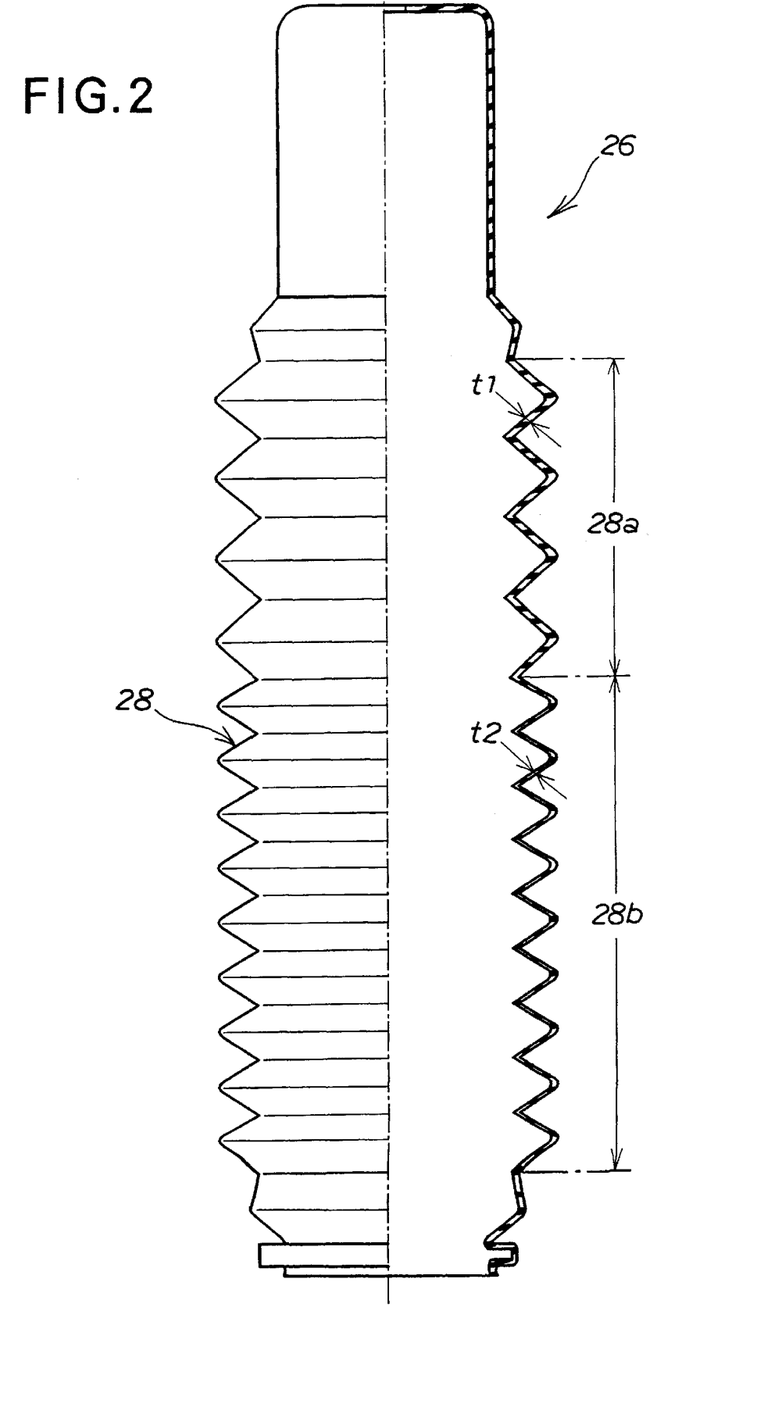
FIG. 2 is an enlarged view showing, partially in section, the dust cover of FIG. 1.

Turning now to FIG. 2, the dust cover 26 according to the present invention is shown on an enlarged scale. The bellows-like portion 28 of the dust cover 26 is comprised of a large-pitched portion 28a having alternating ridges and grooves spaced from each other at an equal but large pitch, and a small-pitched portion 28b having alternating ridges and grooves spaced from each other at an equal but small pitch. In the illustrated embodiment, the large-pitched portion 28a has four ridges while the small-pitched portion 28b has nine ridges. Thus, each of the large- and small-pitched portions has plural ridges spaced at an equal pitch.

Large-pitched portion 28a has a thickness t1 larger than a thickness t2 of the small-pitched portion 28b. Thus, the two thicknesses are t1>t2. Since the small-pitched portion 28b thus has a ridge or groove angle smaller than a ridge or groove angle of the large-pitched portion and the thickness smaller than the thickness of the latter, it can be more easily and quickly deformed than the large-pitched portion 28a when a compressing force is vertically applied to the dust cover 26. It should be noted, however, that in the present embodiment, the ridges have the same height, and the grooves have the same depth. Stated otherwise, the dust cover 26 has a ridge diameter and a groove diameter, which are uniform along the entire length thereof.

Figure 3A:
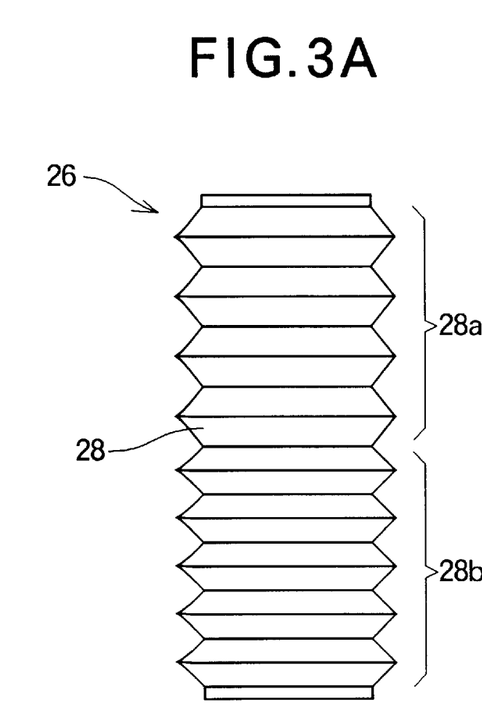
FIG. 3A–FIG. 3C are schematic views illustrating the manner of contraction of the dust cover having two differently-pitched portions, namely, a large-pitched portion and a small-pitched portion.
Figure 3B:
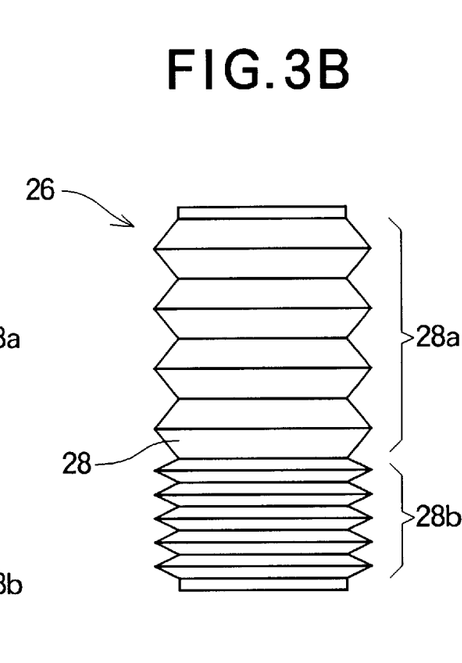
Figure 3C:
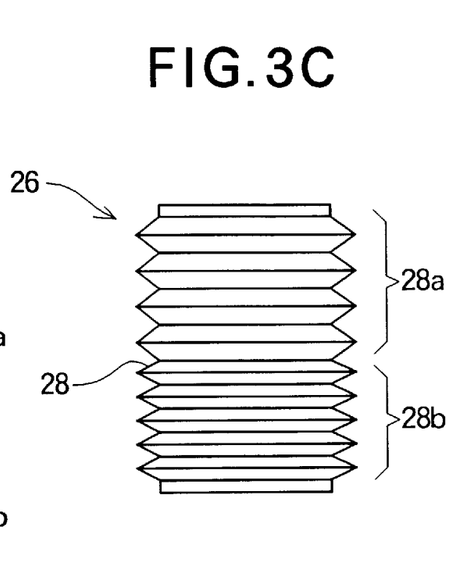

Operation upon contraction of the dust cover 26 is shown in FIG. 3A to FIG. 3C.

When a vertical force is applied to the dust cover 26 shown in FIG. 3A, it starts contraction, whereupon the small-pitched portion 28b first contracts as shown in FIG. 3B, because the small-pitched portion 28b is more liable to collapse or deform than the large-pitched portion 28a in that it has the ridges angled smaller than the ridges of the large-pitched portion 28a and the thickness of the ridges thereof is smaller than the thickness of the ridges of the large-pitched portion 28a. Following the contraction of the small-pitched portion 28b, the large-pitched portion 28a contracts as shown in FIG. 3C. Thus, contraction of the dust cover 26 takes place in a two-phased fashion, whereby buckling width of the dust cover 26 can be kept to a minimum. This makes it possible to design a clearance between the coil spring 30 and dust cover 26 as shown in FIG. 1 to be small, thus leading to the provision of a small-sized strut suspension.

FIG. 4A through FIG. 4D illustrate the manner of contraction of the dust cover 26 having three differently-pitched portions.

Figures 4A, 4B:
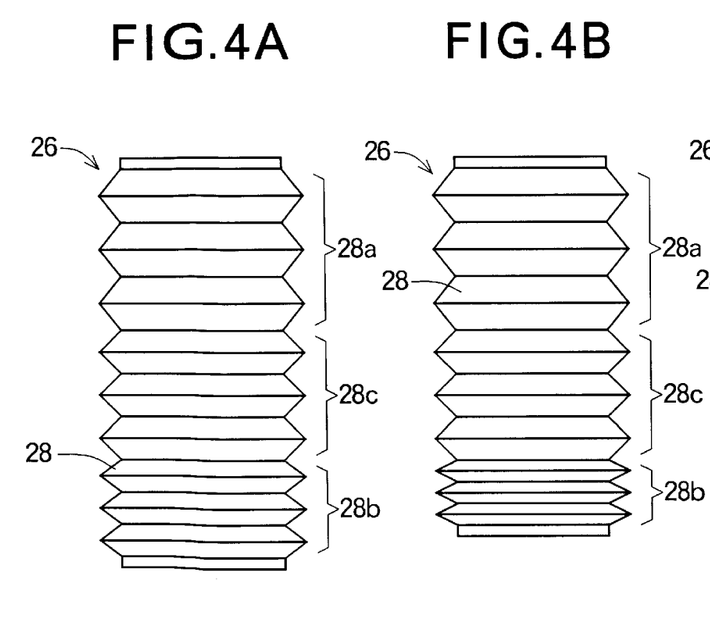
FIG. 4A–FIG. 4D are schematic views illustrating the manner of contraction of the dust cover having three differently-pitched portions, namely, a large-pitched portion, a medium-pitched portion and a small-pitched portion.
Figure 4C:
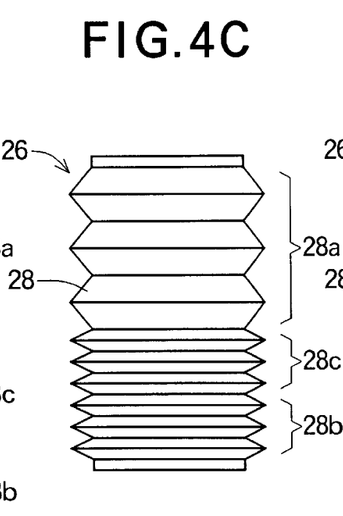
Figure 4D:
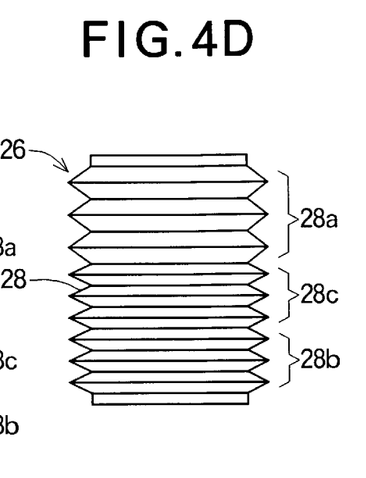

When a vertical force is applied to the dust cover 26 comprised of the bellows-like portion 28 having an upper large-pitched portion 28a, an intermediate medium-pitched portion 28c and a lower small-pitched portion 28b as shown in FIG. 4A, the dust cover 26, for the same reasons as set forth in relation to the aforementioned two differently-pitched (two-phased) bellows-like portion, the small-pitched portion 28b having the ridges spaced at the smallest pitch contracts first as shown in FIG. 4B. Thereafter, the medium-pitched portion 28c contracts as shown in FIG. 4C, whereafter the large-pitched portion 28a contracts as shown in FIG. 4D.

As can be appreciated from the above, it is advantageous to provide the bellows-like portion 28 with several differently-pitched portions in that the dust cover 26 contracts gradually or in a multiphased manner so that buckling can be avoided or kept to a minimum. However, provision of too many differently-pitched portions is undesirable, because the dust cover 26 becomes complicated in construction and hence difficult to manufacture.

Explanation will now be made hereinbelow as to the method of manufacture of the dust cover 26, having reference to FIG. 5A through FIG. 5C, which illustrate the steps of blow molding the dust cover 26.

Figure 5A:
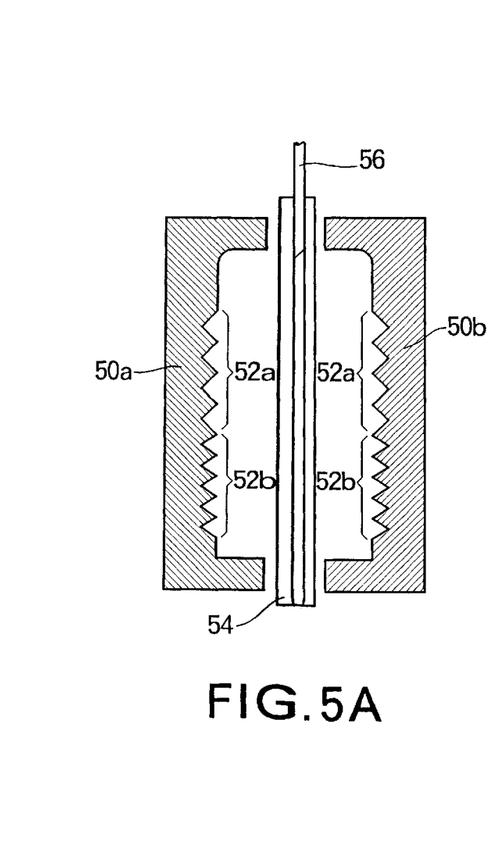
FIG. 5A–FIG. 5C are schematic views illustrating a manner of manufacture of the dust cover according to the present invention by using a pair of metal molds.
Figure 5B:
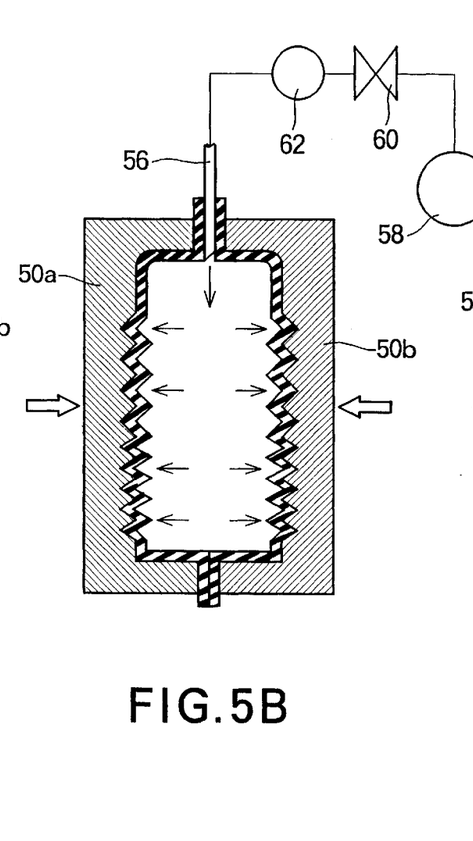

In FIG. 5A, reference numeral 50a and 50b designate a pair of metal molds. On an inner side of each metal mold 50a, 50b, there is provided a corrugated portion which has a plurality of alternating ridges and grooves of uniform diameter and is comprised of a large-pitched portion 52a and a small-pitched portion 52b. The ridges and hence the grooves of the large-pitched portion 52a are spaced from each other at an equal but large pitch while the ridges and grooves of the small-pitched portion 52b are spaced from each other at an equal but smaller pitch. Preheated parison 54 of resilient material such as rubber and synthetic resins is interposed between the metal molds 50a, 50b. Reference numeral 56 designates a blow pipe for blowing pressurized air into the parison 54.

After the metal molds 50a, 50b are mated together, pressurized air is blown into the parison 54 from an air supply apparatus 58 such as an air cylinder or compressor via an air valve 60 and a pressure regulator 62. The pressurized air is desirably 5–6 Kgf m$^2$.

Figure 7A:
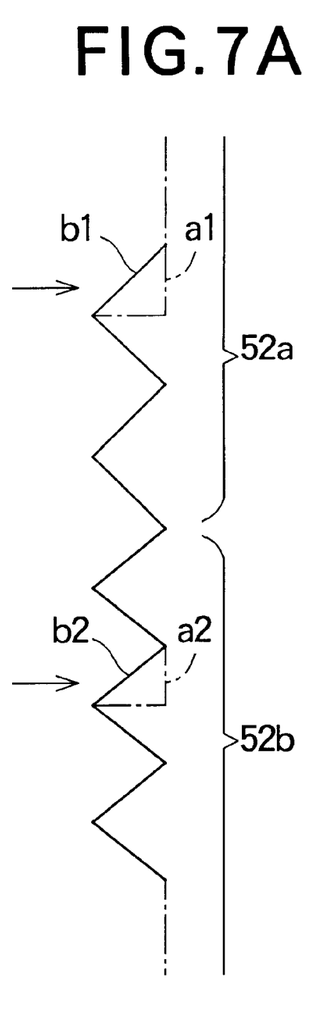
FIG. 7A–FIG. 7C are schematic views explaining how a difference in thickness results between ridges of the large- and small-pitched portions of the dust cover during manufacture thereof by the corresponding portions of the metal molds.
Figure 7B:
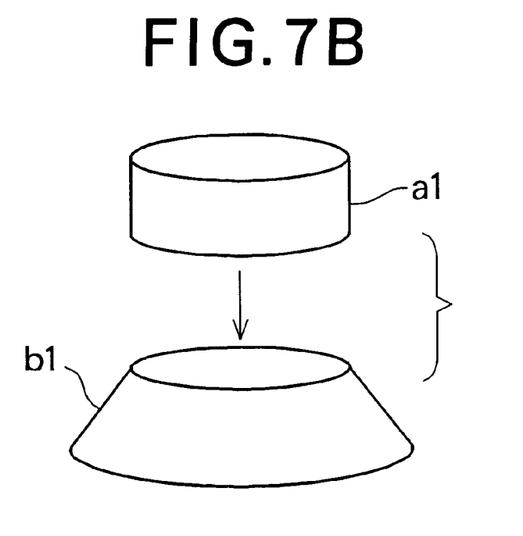
Figure 7C:
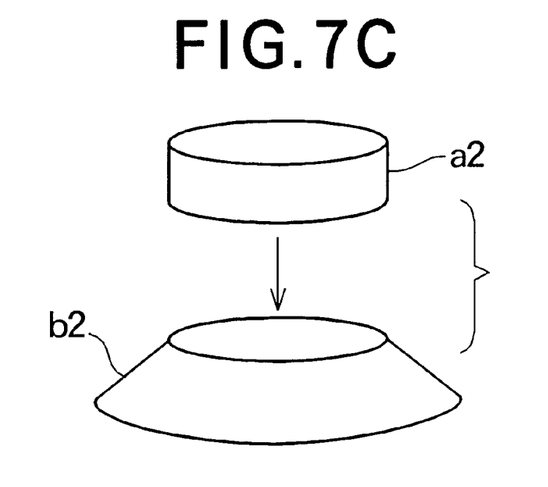

By pressurized air blowing, the parison 54 is blow molded into the shape of a dust cover within the metal molds 50a, 50b. At this time, the parison 54 is caused by the pressurized air to expand in a horizontal direction as shown in FIG. 7A. As a result, a vertical side a1 of each ridge of the large-pitched portion 52a is expanded to cover a hypotenuse b1 of the ridge while a vertical side a2 of each ridge of the small-pitched portion 52b is expanded to cover a hypotenuse b2 of the ridge. As can be appreciated from FIGS. 7B and 7C, a value of the surface area ratio of the vertical side a2 to the hypotenuse b2 of the small-pitched portion 52b is larger than a value of the surface area ratio of the vertical side a1 to the hypotenuse b1 of the large-pitched portion 52a. That is, that portion of the parison 54 which corresponds to the small-pitched portion 28b is expanded more extensively than that portion of the parison 54 which corresponds to the large-pitched portion 28a. Thus, the small-pitched portion 28b is formed thinner than the large-pitched portion 28a.

Figure 5C:
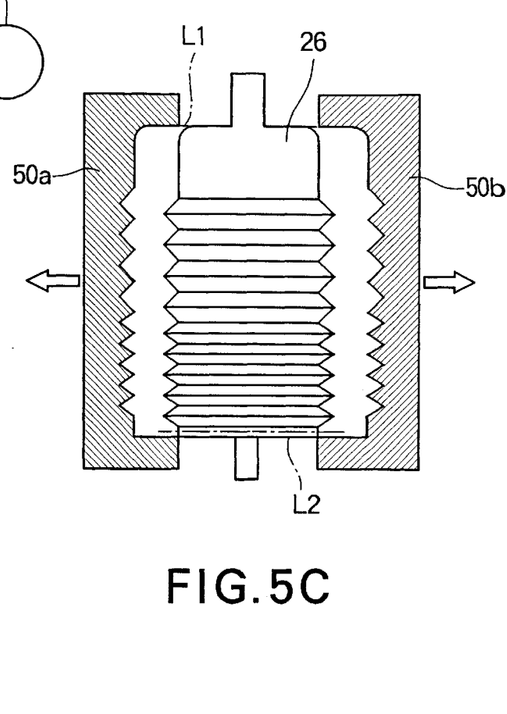

Then, the blow molded parison 54 is cooled, following which the metal molds 50a, 50b are separated as shown in FIG. 5C, whereafter the molded article is taken out from the metal molds and trimmed off at an upper trim line L1 and a lower trim line L2 to thereby provide a completed dust cover 26.

Figure 6:
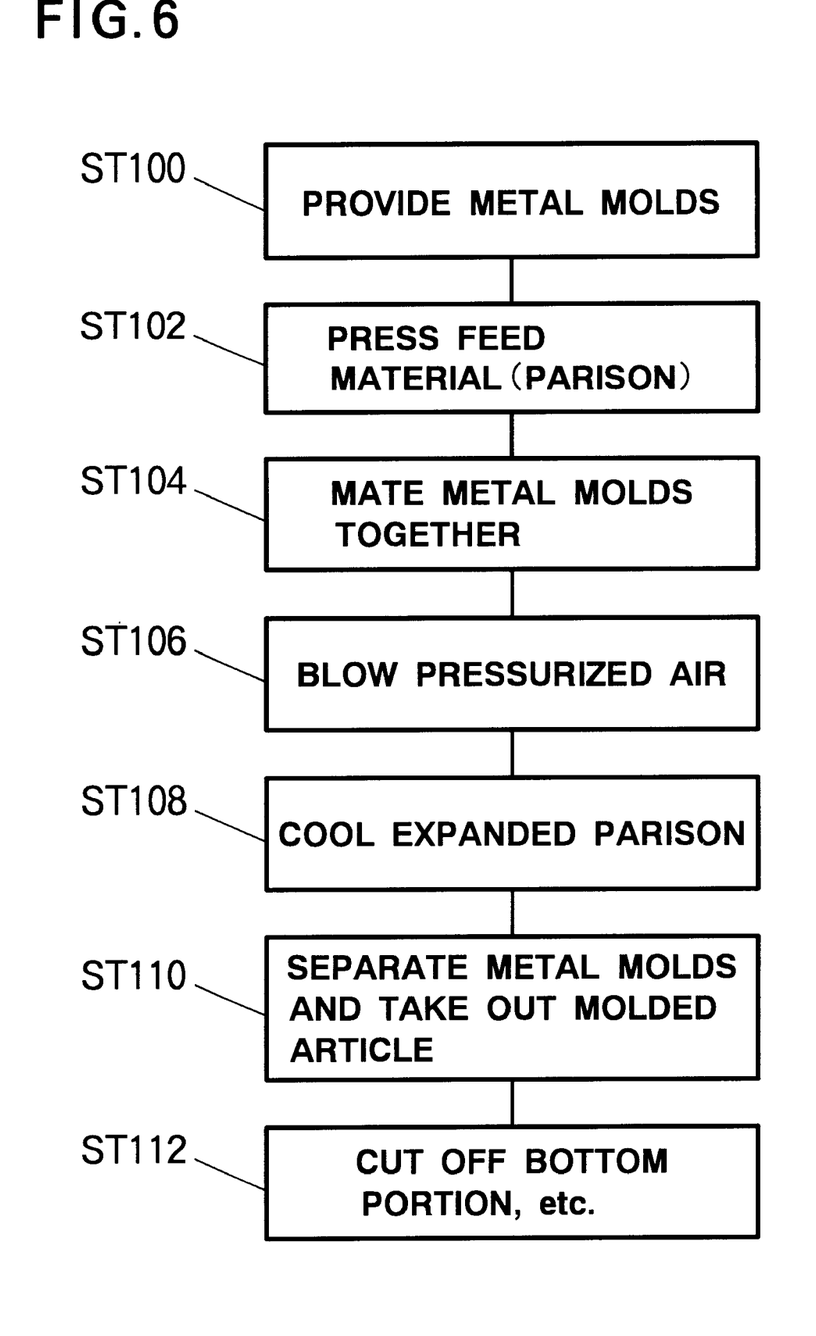
FIG. 6 is a flowchart illustrating steps for manufacturing the dust cover according to the present invention.

Reference is now made to FIG. 6 which is a flowchart of steps involved in manufacturing the dust cover.

Step (hereinafter ST) 100: provide a pair of metal molds 50a, 50b each having on an inner side thereof a corrugated portion which has a plurality of alternating ridges and grooves of uniform diameter and is comprised of a large-pitched portion 52a and a small-pitched portion 52b, the ridges and grooves of the large-pitched portion being spaced from each other at an equal large pitch and the ridges and grooves of the small-pitched portion being spaced from each other at an equal but smaller pitch.

ST 102: press feed a preheated parison 54 of rubber, synthetic resin or the like material between the metal molds 50a, 50b by means of a press machine (not shown).

ST 104: mate the metal molds 50a, 50b together so that the parison 54 is fixedly held between the metal molds in a sandwiched manner.

ST 106: blow pressurized air from an air supply apparatus 58 into the parison 54 via a blow pipe 56 so as to expand or balloon the parison 54.

ST 108: continue supplying pressurized air to thereby cool the deformed parison 54.

ST 110: separate the metal molds 50a, 50b and take out the molded article.

ST 112: cut off top and bottom portions of the ejected article to thereby provide the dust cover 26 according to the present invention.

The dust cover according to the present invention is manufactured in this manner.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A dust cover for enclosing a rod portion and an upper part of a cylinder portion of a shock absorber, comprising a bellows portion, said bellows portion having at least two differently-pitched portions in succession, each of said differently-pitched portions including a plurality of alternating ridges and grooves, said ridges and grooves having a uniform diameter along the entire length of said bellows portion, said ridges and grooves of a first of said differently-pitched portions being spaced from each other at a first equal pitch, said ridges and grooves of a second of said differently-pitched portions being spaced from each other at a second equal pitch.

2. A dust cover according to claim 1, wherein said differently-pitched portions comprise a large-pitched portion having said first equal pitch and a small-pitched portion having said second equal pitch smaller than said first equal pitch.

3. A dust cover according to claim 2, wherein said small-pitched portion has a material thickness smaller than that of the material thickness of said large-pitched portion, said small-pitched portion being collapsible before said large-pitched portion.

* * * * *